United States Patent [19]

Roca et al.

[11] Patent Number: 5,452,240

[45] Date of Patent: Sep. 19, 1995

[54] ELECTRONICALLY SIMULATED ROTARY-TYPE CARDFILE

[75] Inventors: Robert J. Roca, Los Angeles, Calif.; Ronald D. Cranford, Harrisburg, N.C.

[73] Assignee: Roca Productions, Inc., Culver City, Calif.

[21] Appl. No.: 156,104

[22] Filed: Nov. 23, 1993

[51] Int. Cl.⁶ ............................................. G06F 1/00
[52] U.S. Cl. .................................................. 364/705.06
[58] Field of Search ............ 364/705, 06, 400, 419.07, 364/419.13, 419.19; 395/119, 148

[56] References Cited

U.S. PATENT DOCUMENTS

| | | |
|---|---|---|
| Re. 32,655 | 4/1988 | Levine . |
| D. 325,601 | 4/1992 | Chen . |
| 4,095,273 | 6/1978 | Gonzalez . |
| 4,117,542 | 9/1978 | Klausner et al. ............... 364/705.06 |
| 4,649,499 | 3/1987 | Sutton et al. ........................ 395/119 |
| 4,670,853 | 6/1987 | Stepien . |
| 4,715,010 | 12/1987 | Inoue . |
| 4,796,214 | 1/1989 | Fisherman . |
| 4,847,760 | 7/1989 | Yagi ..................................... 364/400 |
| 4,864,592 | 9/1989 | Lee . |
| 4,912,640 | 3/1990 | Tsugei . |
| 4,974,170 | 11/1990 | Bouve et al. . |
| 4,974,183 | 11/1990 | Miller . |
| 5,073,054 | 12/1991 | McDowell . |
| 5,150,293 | 9/1992 | Murata et al. ................... 364/705.06 |
| 5,179,502 | 1/1993 | Matsuda . |
| 5,181,273 | 1/1993 | Ohtani . |
| 5,237,651 | 8/1993 | Randall ............................... 395/148 |

FOREIGN PATENT DOCUMENTS

| | | |
|---|---|---|
| 2755403 | 6/1979 | Germany . |
| 56-40958 | 4/1981 | Japan . |
| 56-159754 | 12/1981 | Japan . |

*Primary Examiner*—Tan V. Mai
*Attorney, Agent, or Firm*—Poms, Smith, Lande & Rose

[57] ABSTRACT

A thin, portable, lightweight electronic name and address cardfile optionally including memo alarm, calendar and calculator functions, is provided with a contact and movement sensitive scrolling mechanism for sequentially advancing electronically simulated name and address cards in the style of bottom-attachable index cards. The scrolling function is accomplished by manipulating a graphic representation of a rotary actuator of the type provided on a mechanical rotary-type directory. The simulated card-flipping is accompanied by an artificial sound effect reminiscent of the expected sound of cards flipping. The device may be provided with holes positioned so as to render the device insertable within a loose-leaf ring-type binder notebook or personal organizer.

25 Claims, 20 Drawing Sheets

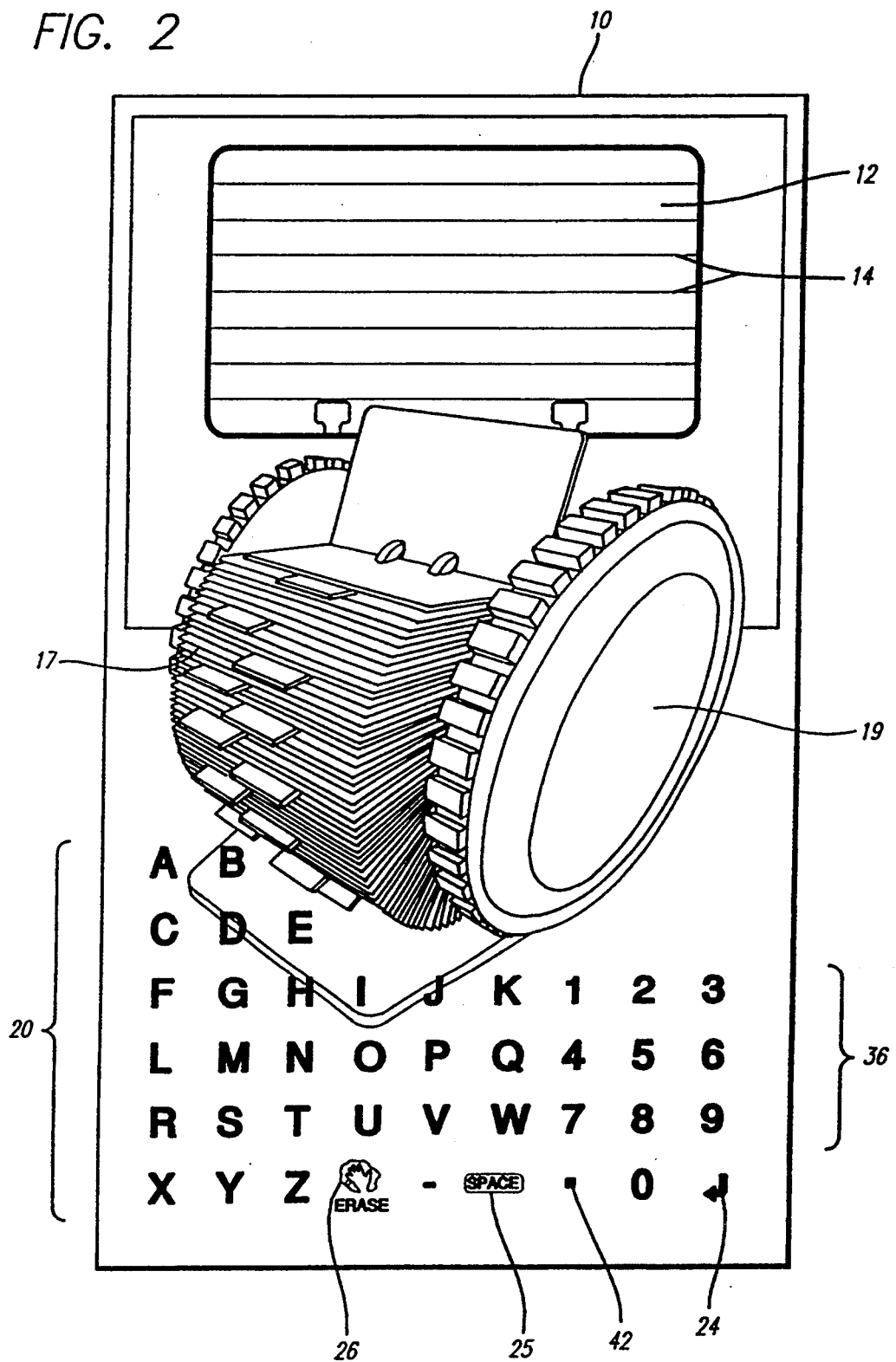

FIG. 3

*Telephone:*

To Enter a number— Press  hold to second beep.

To Store a number— Press  to a beep (continue holding to second beep to enter in succession).

To Look up a number— key in first few characters and press the enter key. 

*Calendar:*

To set date— Push  and hold till second beep.

Enter date.

Push 

Left wheel advances and reverses year on calendar / right wheel advances and reverses month on calendar.

*Alarm:*

To set alarm— Press  and follow screen.

Change number and "A" for AM or "P" for PM.

Then enter message. (up to 3 lines).

Then push  for storage.

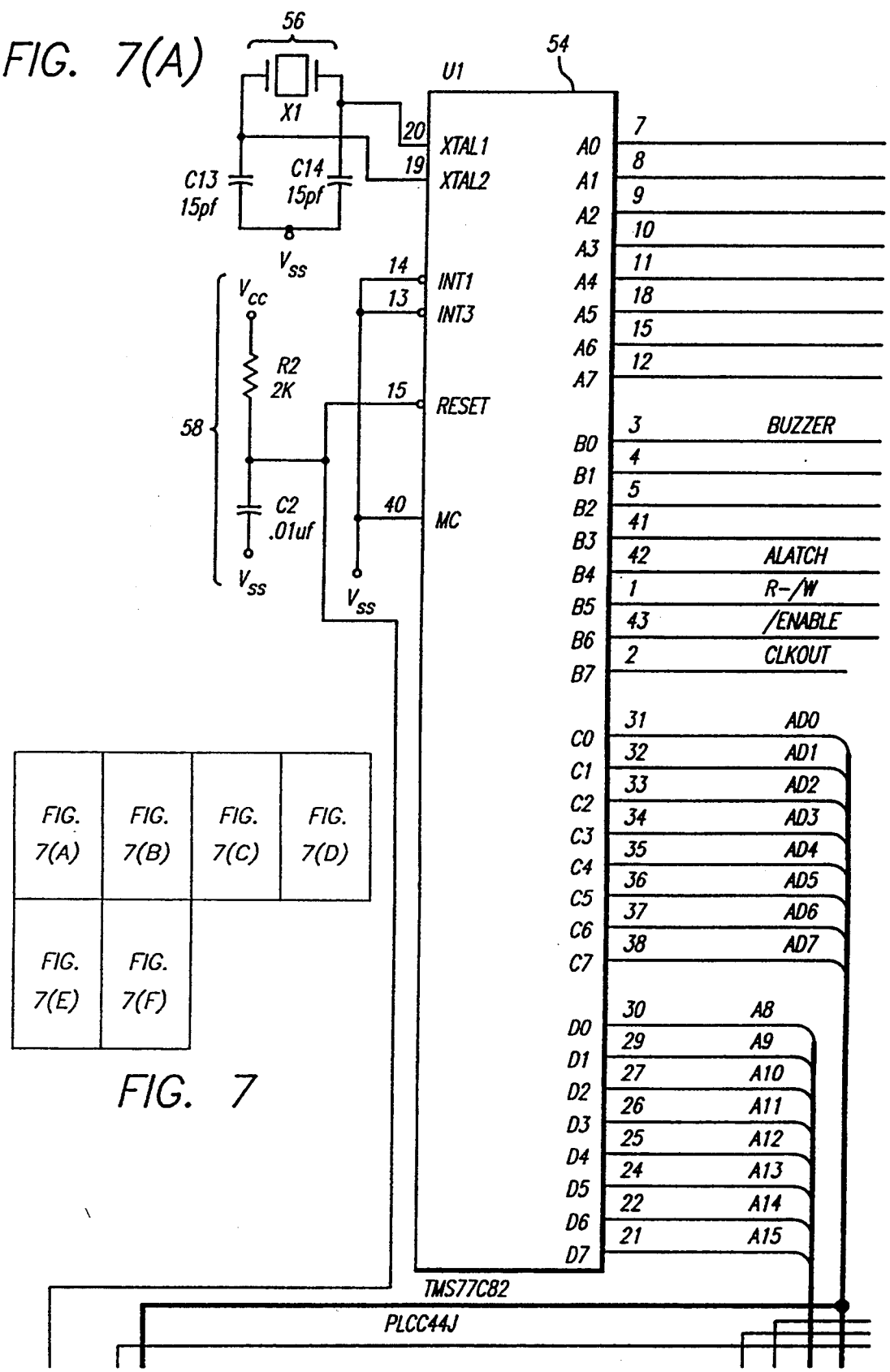

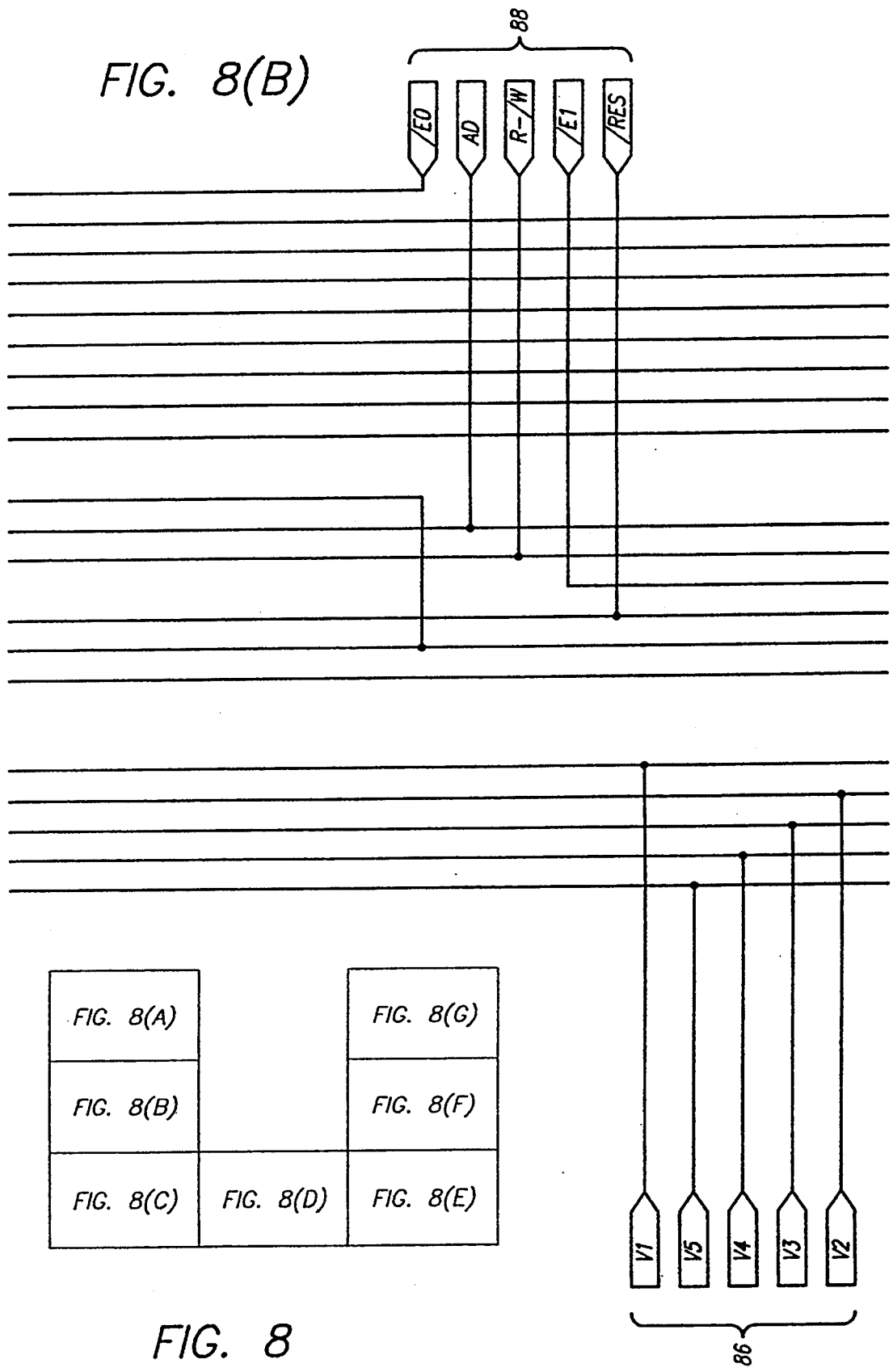

ELECTRONICALLY SIMULATED ROTARY-TYPE CARDFILE

BACKGROUND OF THE INVENTION

1. Field of the Invention

This invention relates to the field of electronic cardfile/memo/calendar/alarm/calculator devices, and in particular to an electronic name and address cardfile which simulates the operation, performance and appearance of a mechanical rotary-type cardfile.

2Description of the Related Art

Most persons accustomed to office work are familiar with mechanically operable rotary-type index card holders, or "desktop rotary cardfiles". These mechanical rotary cardfiles are typically rotated to locate the desired card by manipulating a rotary actuator or grip which is connected to a central shaft. The rate and direction of scrolling from card to card is controlled by the rate and direction of movement imparted to the rotary actuator by the operator's hand.

These type of devices have become so popular that, as office work has become increasingly more efficiently automated by the advent of microprocessor-controlled electronic systems, such as the personal computer (PC), there has arisen a popular desire to replace these mechanical rotary-type card holders with an electronic substitute, embodying all of the advantages of electronic over mechanical systems (such as greater storage capability, greater flexibility of operation, ease of erasure, editing, or other word-processing capabilities, compactness, light weight, etc.).

Accordingly, there is available at the present time a variety of compact, portable, lightweight, electronic information-processing devices for storing and retrieving personal and/or business information.

For example, U.S. Pat. No. 4,117,542, issued to Klausner et al, discloses an electronic pocket directory for storing and retrieving telephone numbers, street addresses, personal reminders and the like. The device includes a sequence key of the conventional type which allows the operator to scroll from one memory address to an adjacent memory address. The sequence key is depressed once to display the information stored at an adjacent memory address, twice to display the information stored at the next adjacent memory address, etc.

However, none of the available electronic name and address directories provide an electronic scrolling mechanism which is responsive to the rate and direction of movement of the operator's hand (or any user-controlled contactor device) so as to simulate the operation and performance of a mechanical rotary actuator or grip. Nor do the available electronic directories provide such a scrolling mechanism with a graphic or visual representation of a mechanical rotary actuator which can be manipulated to effect the desired scrolling between memory addresses, such an electronic scrolling mechanism having an operable visual representation of a mechanical rotary actuator being referred to hereinafter as a "simulated rotary actuator".

For example, U.S. Pat. No. 5,237,651, issued to Randall, discloses an electronic personal organizer which electronically displays graphic representations of pages of a loose leaf mechanical personal organizer, including user selectable operational modes for input and retrieval of names, addresses and other personal information. However, there is no teaching of an electronic scrolling mechanism which simulates the operation and performance of the rotary actuator of a mechanical rotary-type directory. Nor is there a teaching of such a device further including a operable graphic of a mechanical rotary actuator.

Similarly, U.S. Pat. No. 4,649,499, issued to Sutton et al, which discloses programming means for the input and display of information on an electronically simulated image of a rotary card file including knobs for scrolling through simulated cards, does not teach or suggest an electronic scrolling mechanism which is responsive to the rate and direction of movement of the operator's hand.

Accordingly, there has been a need for an electronic device which better simulates the operation and performance of mechanical rotary-type directories.

Also, there has been a need for a device of such a type which additionally incorporates other known features of compact electronic information processing devices, such as a calendar system, a memo alarm system, a calculator, etc.

Furthermore, there has been a need for such a device in which the additional features are rendered more user-friendly by provision of graphical icons which visually suggest the feature to be called upon.

Finally, there has been a need for such a device in the form of a divider-sheet for a ring-binder notebook or personal organizer, in which case the device would be conveniently available at the point of most frequent use.

SUMMARY OF THE INVENTION

In accordance with the principles of the present invention, there is provided a lightweight electronic name and address directory device, optionally including memo, alarm, calendar and calculator functions, and further including an electronic scrolling mechanism which is responsive to the rate and direction of movement of the operator's hand so as to simulate the operation and performance of the mechanical rotary actuator of a mechanical rotary-type cardfile. The scrolling mechanism further includes a graphic representation of a mechanical rotary actuator which can be manipulated by the user's thumb or another user-controlled contactor device to effect the desired scrolling function. As the operator's thumb (or other finger or contactor device) is slid forward or backward along a flat substantially rectilinear strip depicting an edge of a rotary actuator, internal electronics (controlled by embedded software) cause corresponding sequential "clockwise" or "counterclockwise" advancement of standard detachable rotary-type index cards, which are visually simulated upon an LCD display screen. This simulated card-flipping is accompanied by an artificial sound effect reminiscent of the expected sound of cards flipping. Both the direction and the rate of simulated sequential flipping is controlled by the rate of movement of the operator's thumb along the simulated rotary actuator. A standard flat keyboard allows operator entry of, and erasure of, alphanumeric characters upon any selected simulated card. Flat pressure-sensitive icons depicting a telephone, an alarm clock, a calendar pad, and (optionally) an early-style calculator provide access to the directory, alarm, predated reminder, and (optional) calculator functions.

In accordance with a further aspect of the invention, the external face of the device may present a perspective depiction of the rotary actuator for a mechanical rotary-type index card holder in which case the operator's thumb (or other finger or contactor device) is slid forward or backward along an arcuate strip corresponding to the depicted edge of the mechanical rotary actuator to effect desired scrolling functions.

In accordance with a further aspect of the invention, the device may be provided with holes positioned so as to render the device insertable within a conventional loose-leaf ring-type binder notebook or personal organizer.

More broadly, the principles disclosed herein are applicable to any information-processing system which includes a capability for alphanumeric data input by the user, a visual display which presents simulated index cards, and a contact and sliding-motion activated scrolling mechanism whose surface appearance and operative mode emulates that of the mechanical actuator under mimicry, and whose embedded software operates upon both the direction and the rate of change of the scrolling-signal input.

Other objects, features, and advantages will become apparent from a consideration of the following detailed description and from the accompanying drawings.

BRIEF DESCRIPTION OF THE DRAWINGS

FIG. 2 depicts the face of an alternative presently preferred embodiment of the invention wherein the simulated rotary actuator includes an operable depiction of a perspective view of a mechanical rotary cardfile.

FIG. 3 depicts user-friendly instruction-sets for sequential pressing and pushing of (and thereby operating) the icons of FIGS. 1–2;

DETAILED DESCRIPTION OF THE PREFERRED EMBODIMENT(S)

Figure 1:
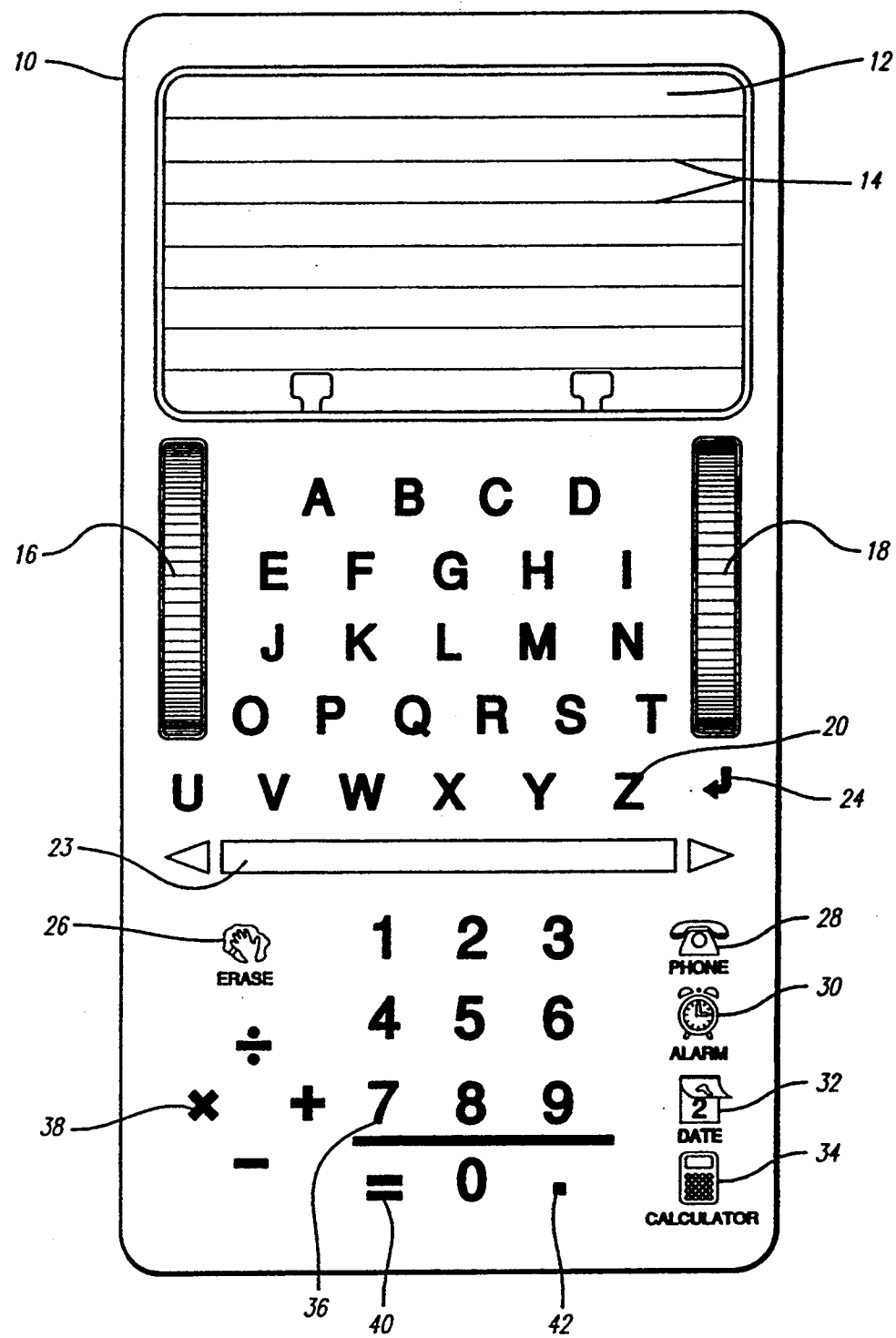
FIG. 1 depicts the face of one presently preferred embodiment of the invention wherein the simulated rotary actuator includes an operable depiction of a side view of a mechanical rotary actuator.
Figure 4:
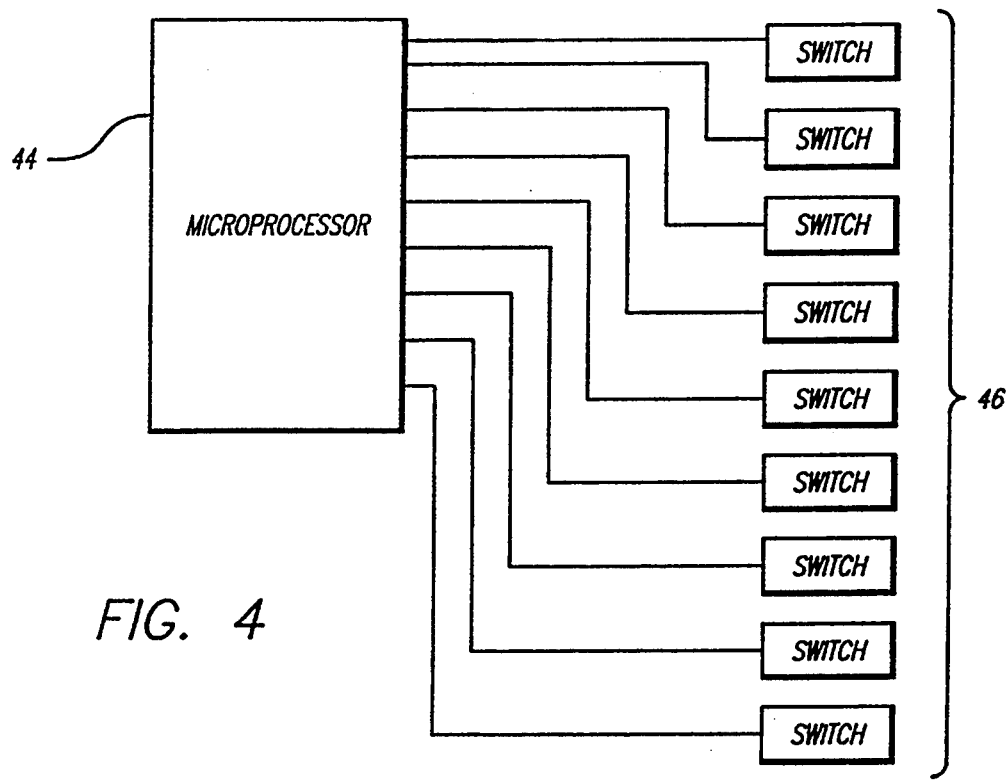
FIG. 4 is a schematic block diagram depicting the method of implementing the operation of a simulated rotary actuator.
Figure 5:
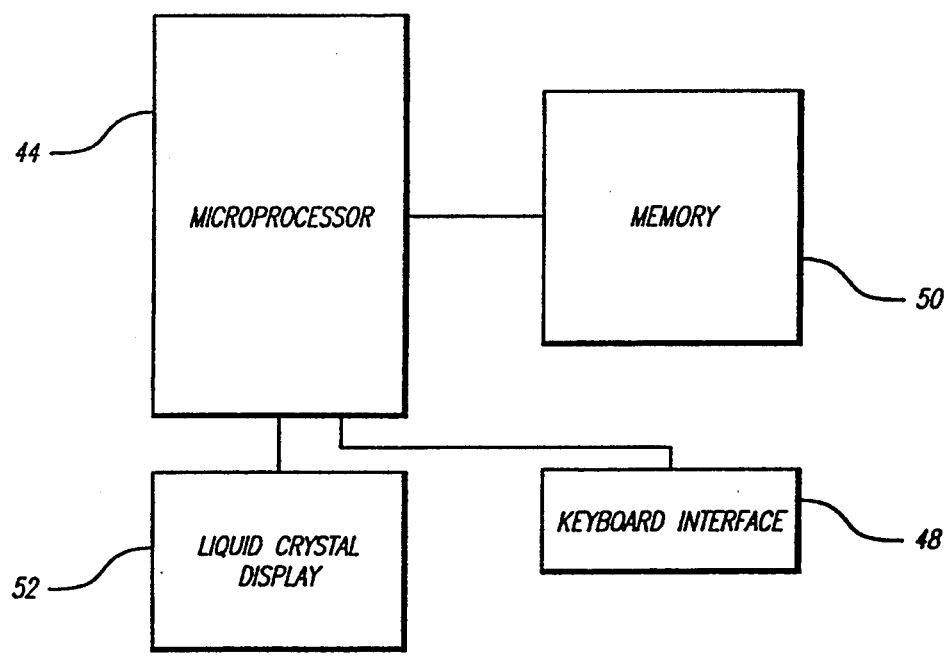
FIG. 5 is a schematic block diagram depicting the relationship between the keyboard interface and the LCD display screen, via a microprocessor endowed with memory storage capability.

Referring more particularly to the drawings, FIG. 1 shows the externally visible features of a first presently preferred embodiment, while FIGS. 4–5 depict, in schematic modular or block diagram form, the principal internal features of this embodiment.

The first preferred embodiment is a lightweight, portable, user-friendly information-processing device, self-contained within a thin enclosure 10. The device incorporates an internal microprocessor unit 44 and a memory unit 50, an externally visible LCD display screen 12 (which can simultaneously display up to 6 lines of information) and corresponding internal circuitry unit 52, and an externally accessible flat keypad 20 and a corresponding internal keyboard interface unit 48.

The device is principally designed to simulate the performance, operation and appearance of a mechanical rotary-type directory and includes user selectable operational modes for the input and retrieval of names, addresses, phone numbers, personal memoranda and the like, and further includes a calculator.

The "phone directory mode" can be switched on by pressing the icon 28 which portrays a telephone; the "memo alarm" mode can be summoned by pressing the icon 30 which portrays an alarm clock; the "calendar mode" can be invoked by touching the icon 32 which portrays a calendar pad; and the "calculator mode" can be invoked by touching the icon 34 which portrays an early-style hand-held electronic calculator.

In the "phone directory mode", names, addresses, phone numbers and additional lines of free-form information may be stored and thereafter retrieved alphabetically, preferably by name or first line of information stored.

In the "memo alarm mode", a memo alarm may be set up to 364 days in advance. When the alarm occurs, up to 5 lines of information, which were entered when the alarm was set, are displayed, e.g. "Dentist appointment at 6:00 with Dr. John."

In the "calendar mode", a calendar is provided which can show any month from the year 1900 through the year 2100 with full month displays included. The display in this mode also shows the then current time. (Obvious alternative variations for particular user-markets would provide calendars other than the Gregorian, e.g. the Orthodox Jewish calendar, the Islamic calendar, etc.)

The first presently preferred embodiment also includes a "calculator mode" for performing the functions of a standard four-function calculator.

When the user enters the "phone directory mode", the LCD screen 12 displays an electronically simulated name and address index card in the style of a conventional bottom-attachable index card. The simulated index card includes an graphic image of the two slots typically provided at the bottom of a detachable index card of the type used in conjunction with a rotary-type index cardholder or its non-rotatable counterpart. The LCD screen 12 is preferably substantially rectangular in shape.

As best shown in FIG. 1, the electronically simulated card may also include a plurality of horizontal opaque lines upon which alphanumeric characters may be displayed. In embodiments where it is desirable to simulate an index card in all operational modes, the horizontal lines and/or lower edge slots may be fixed to a transparent screen-cover or even upon the screen 12 itself.

In the preferred embodiment depicted in FIG. 1, keyboard 20 includes alphanumeric keys and a simulated typewriter-style spacebar 23 for entering characters to be stored and displayed on the simulated cards and an erasure key 26 for editing entries. All of these keys are flat, pressure sensitive icons made operable by known and standard techniques (such as are commonplace in e.g. flat-key calculators). After a string of alphanumeric characters has been keyed onto the LCD display, the string may be entered into the microprocessor 44 for subsequent storage in the memory unit 50 by pressing the entry key 24.

In an alternative preferred embodiment, the device may additionally include known electrical or infrared means for transferring name and address information between the device and a PC or other information-processing device.

The first presently preferred embodiment also includes four algebraic-operation keys 38 (for addition, subtraction, multiplication and division), an equal sign icon 40 for execution of arithmetic operations, and a decimal point key 42, are provided, all of which function upon entry into the "calculator mode". As numbers are entered, they are automatically scrolled up on the LCD display 12. This allows the last six entries to be verified.

User-friendly instructions for operation of the phonelist, calendar, and alarm icons are presented in FIG. 3. These instruction sets may be printed upon an otherwise unoccupied surface of the enclosure 10, such as its rear external face. In an alternative embodiment, initial operator pressure on any of the icons (including the optional calculator icon) brings about a presentation of the corresponding instruction on the LCD display screen.

The device may also include auditory and/or visual signals similar to the warning beeps provided on personal computers (PCs) to alert the user to some contingency.

Advantageously, the device is provided with a unique user interface for advancing the LCD screen from a displayed memory address to a desired memory address. The unique user interface includes a contact and movement sensitive scrolling mechanism embedded below an externally visible representation 16 or 18 of the rotary actuator of a mechanical rotary-type directory. In one preferred embodiment, sequential advancement or scrolling from a displayed memory address to a desired memory address is effected by user manipulation of a graphic representation of a substantially rectilinear depiction of the serrated edge of a mechanical rotary actuator of the type provided on a mechanical rotary-type directory as is best shown in FIG. 1. The user merely slides his or her thumb or finger or another user-controlled contactor device upward or downward along either rectilinear strip 16 or 18. Internal electronics controlled by embedded software and responsive to the sliding movements of the contactor device effect sequential "clockwise" or "counterclockwise" advancement between simulated cards. A sliding movement in a first direction between opposing ends of strip 16 or 18 effects sequential advancement in a "clockwise" direction between a displayed simulated card and a desired simulated card. A sliding movement along strip 16 or 18 in the opposite direction effects sequential advancement in the "counterclockwise" direction thereby allowing for redisplay of the initially displayed simulated card (or other desired card).

Advantageously, the rate of sequential advancement is controlled by the rate of sliding movement of the user-controlled contactor device along strip 16 or 18 with a faster sliding movement corresponding to a faster sequencing rate and a slower sliding movement corresponding to a slower sequencing rate. This allows the user to control the rate of sequential advancement between simulated cards in a manner which simulates a user's operation of a mechanical rotary actuator (with the direction and rate of sequencing being controlled by the rate and direction of movement imparted to the actuator by the user's hand).

The above described unique interface is preferably implemented using a series of single pole, single throw switches 46. These switches are implemented through the use of a thin transparent flexible silicon rubber switch overlay which includes operable graphic representations 16 and 18.

Graphic representations 16 and 18 are preferably printed on the underside of the overlay along with the other visual icons described above using methods known in the printing arts. The underside of the overlay is thereafter provided with a conductive coating preferably selected from the group of carbon-based polymers or inks which are impregnated with graphite. Alternatively, a carbon-based polymer or ink impregnated with gold, silver or another conductive material may be used.

After the preferred conductive material is applied to the underside of the overlay, the overlay is laminated to a printed circuit board with an adhesive coated spacer provided therebetween. The spacer is a cutout beneath the coating on the overlay. This cutout also aligns with a series of contact patterns on the printed circuit board (PCB) beneath. When pressure is applied to the surface of the overlay, the overlay sags, allowing the conductive coating on the overlay to short the underlying contacts on the PCB. This short is sensed by the microprocessor 44 as a switch closure of one of the switches 46.

While silicon rubber is a preferred material for the flexible switch overlay, other flexible materials known in the relevant arts including mylar, polyester, acrylic and polycarbonate may be used in the alternative.

In a preferred embodiment of the present invention, the exposed outer side of the chosen substrate may be selectively textured with a transparent finish using methods and materials known in the relevant arts so that the user's fingerprints do not readily appear on the selectively textured portions of the exposed outer side.

The contacts (switches) 46 on the PCB are laid out in such a manner as to provide for sequential closure as a finger or other user-controlled contactor device, such as a pencil, is applied against the operable graphic-bearing portion of the overlay and moved in either direction between the ends of the graphically represented rotary actuator. The microprocessor 44 senses the sequential closure of the switches 46 and determines the direction and rate of travel of the contact pressure point. Once the direction and rate of movement are determined, the microprocessor takes whatever action is required, based on the current operational mode of the preferred embodiment. Advantageously, contact need not be made with every switch concealed below strip 16 or 18 in order for the underlying scrolling mechanism to perform in the manner described.

Figure 6:
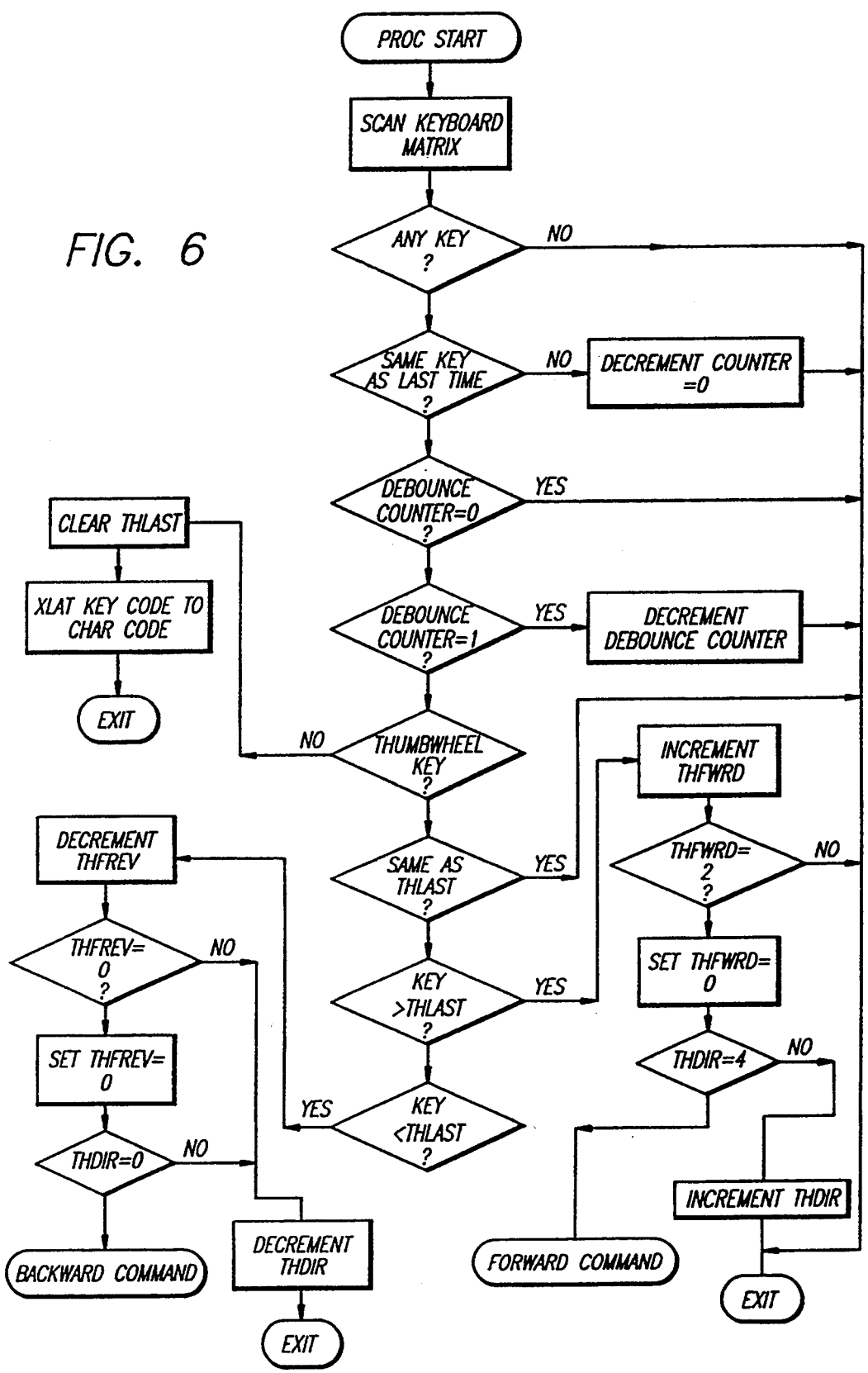
FIG. 6 is a programming flowchart depicting the embedded program which implements the operation of the simulated rotary actuator.
Figure 7B:
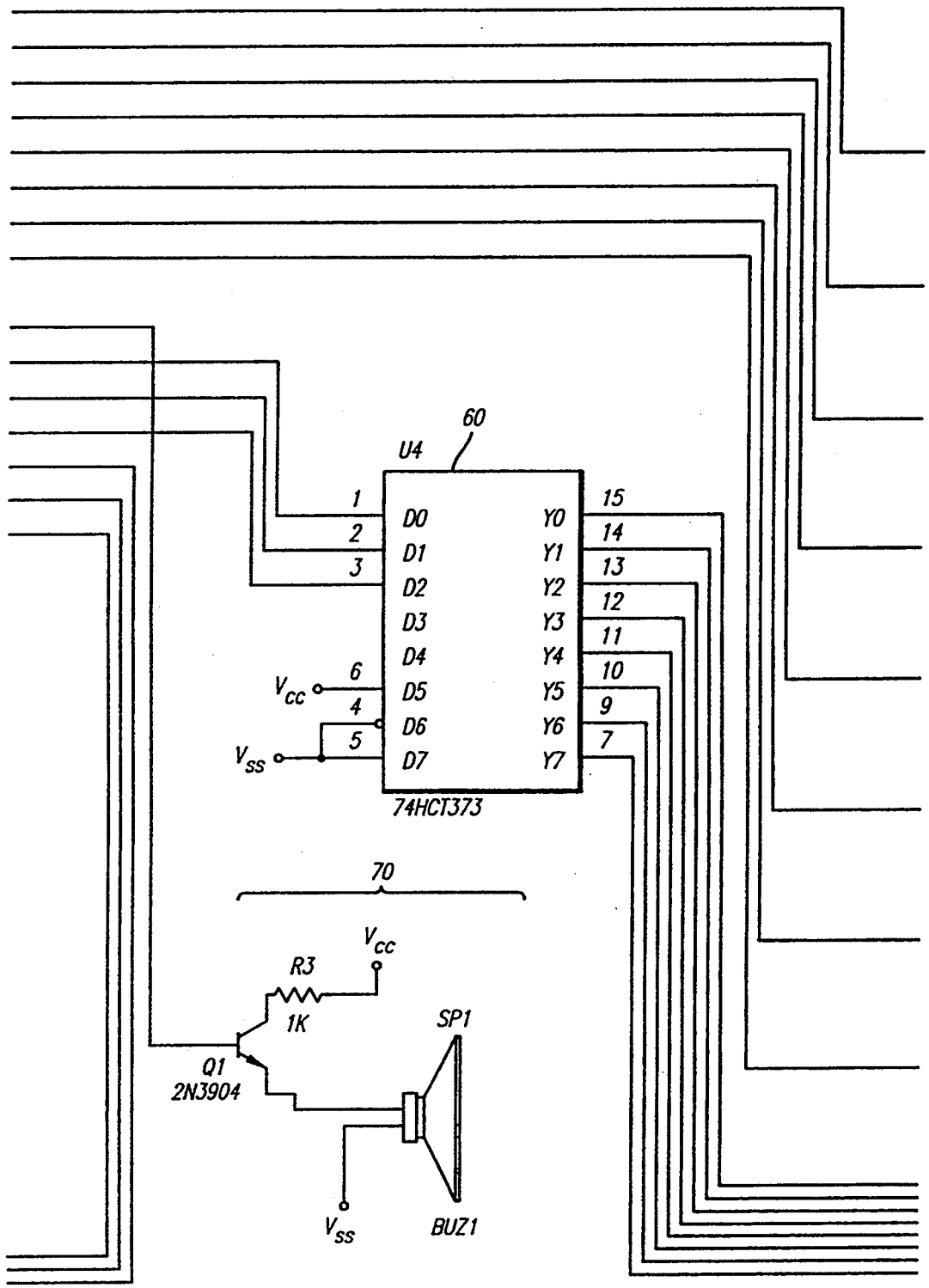
FIG. 7 (composed of the union of FIGS. 7A–7F) is a schematic logical circuit diagram depicting the relationship between the microprocessor and the switch matrix which implements the simulated rotary actuator.
Figure 7C:
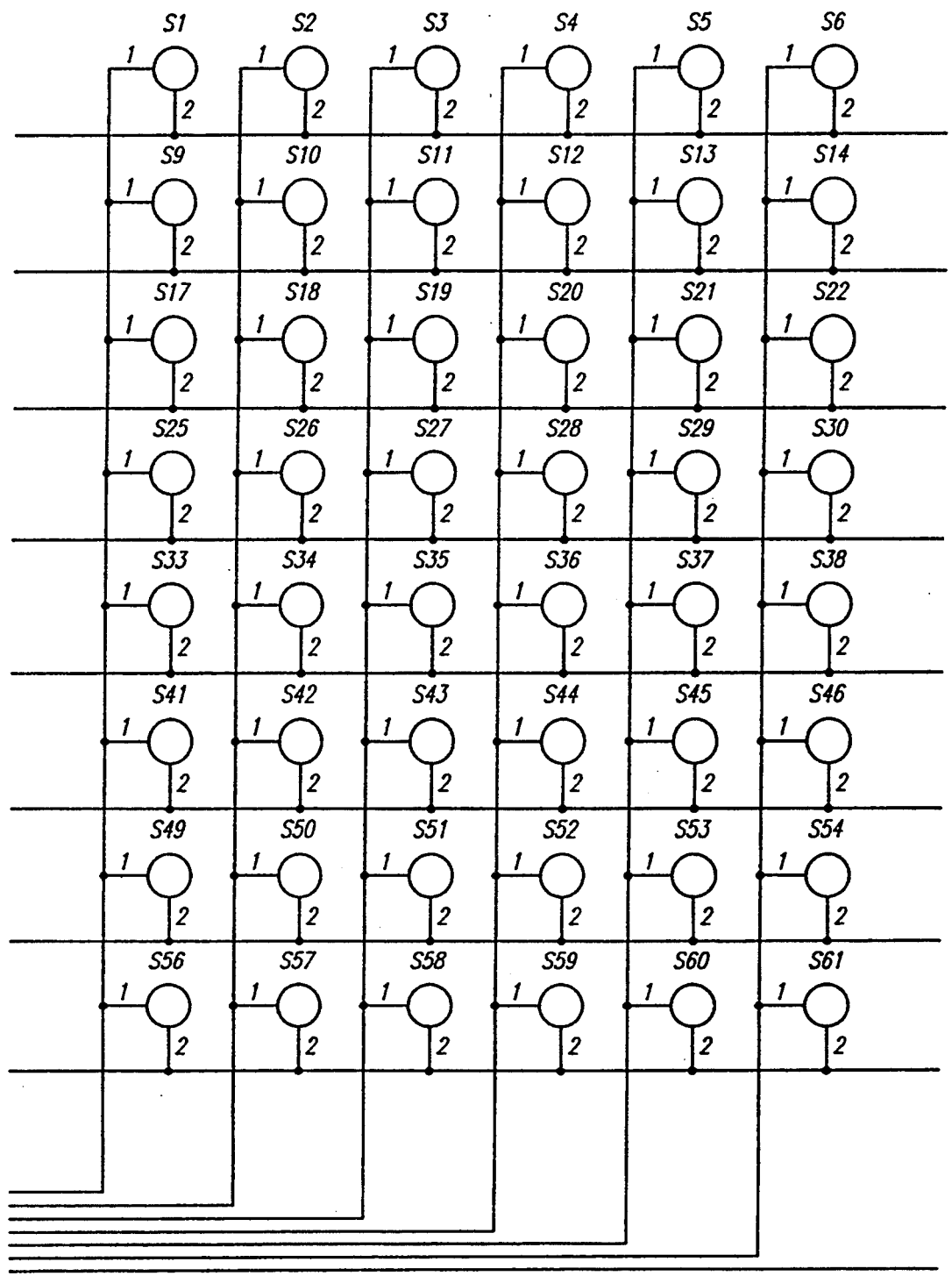
Figure 7D:
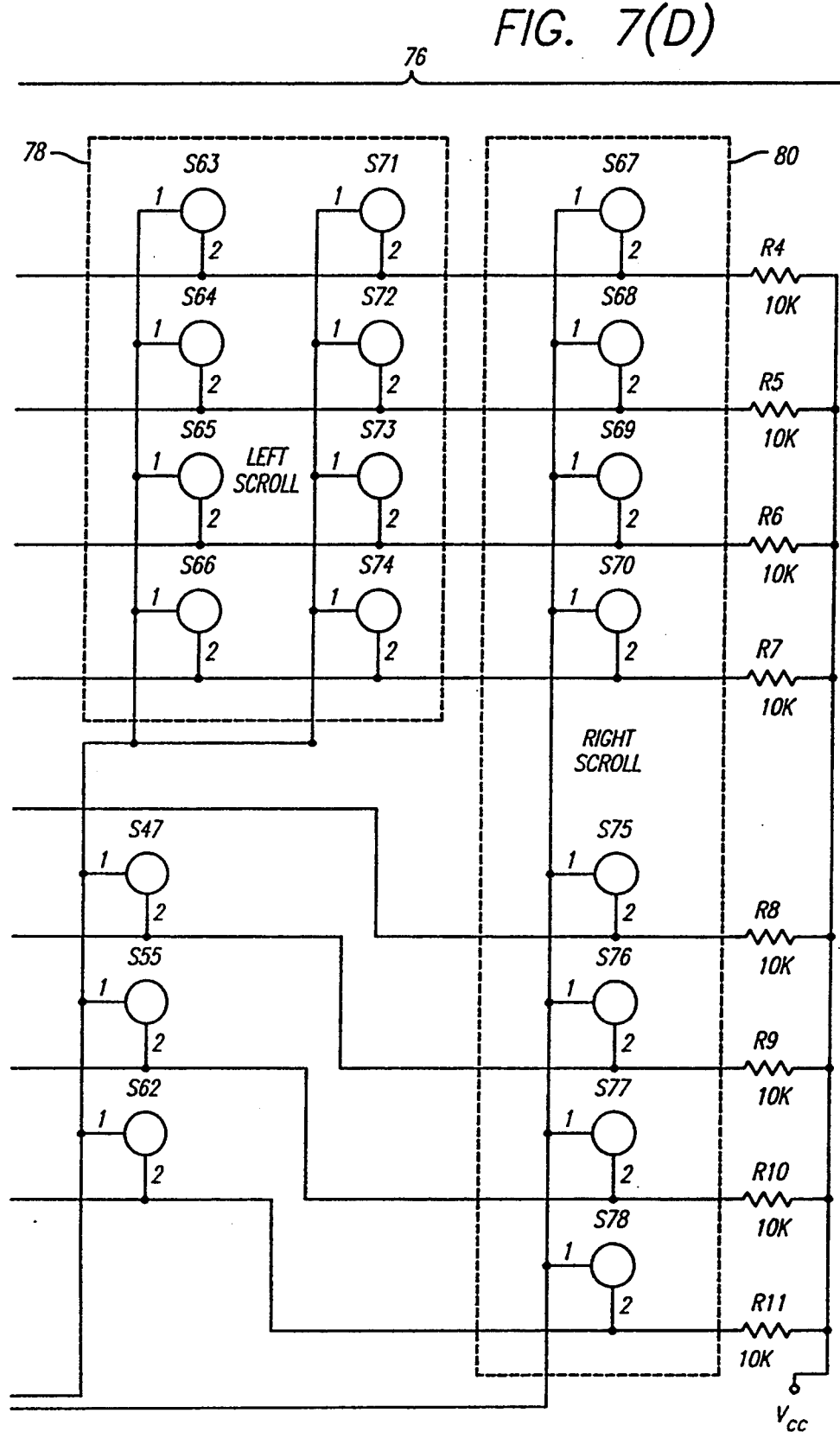
Figure 7E:
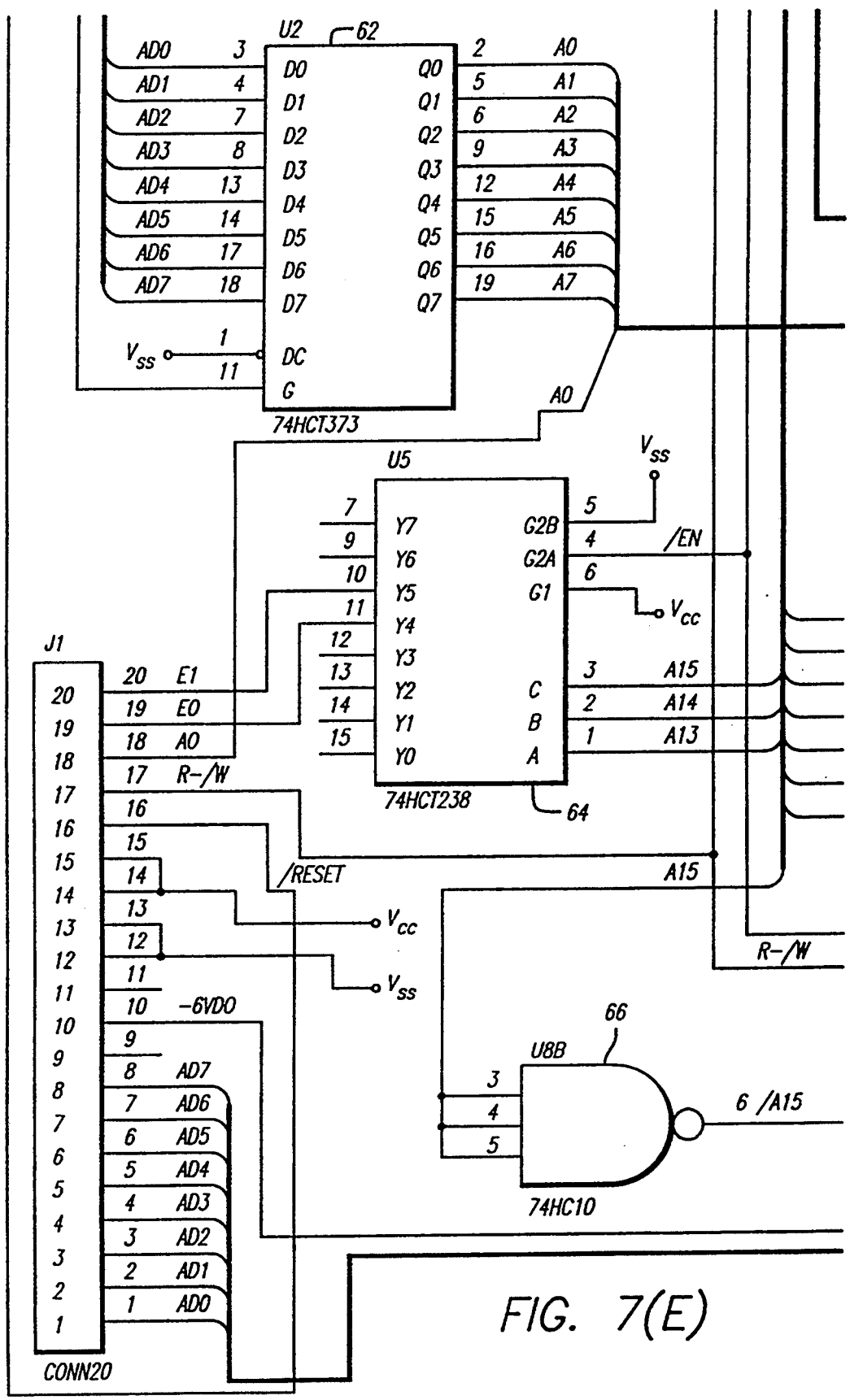
Figure 7F:
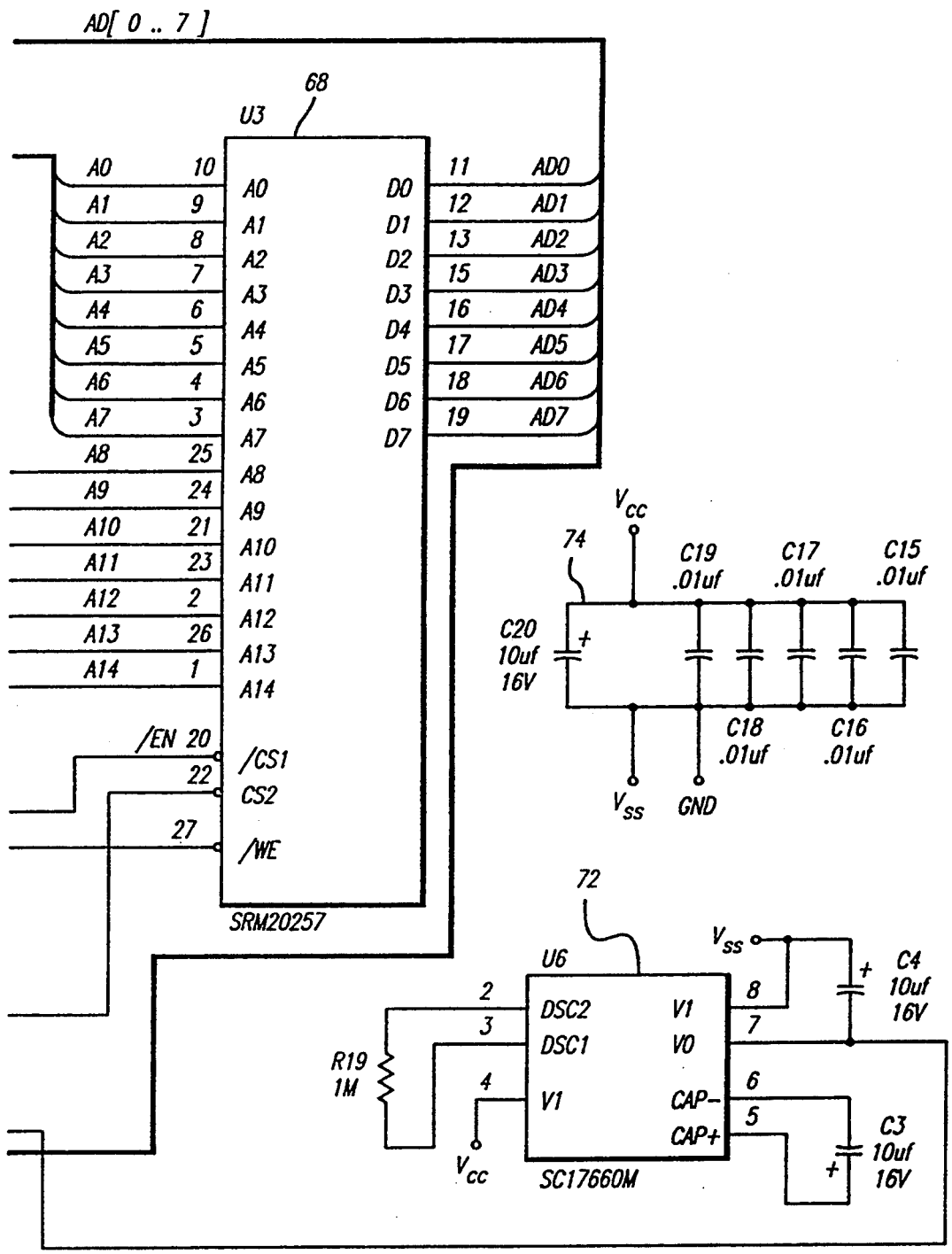
Figure 8A:
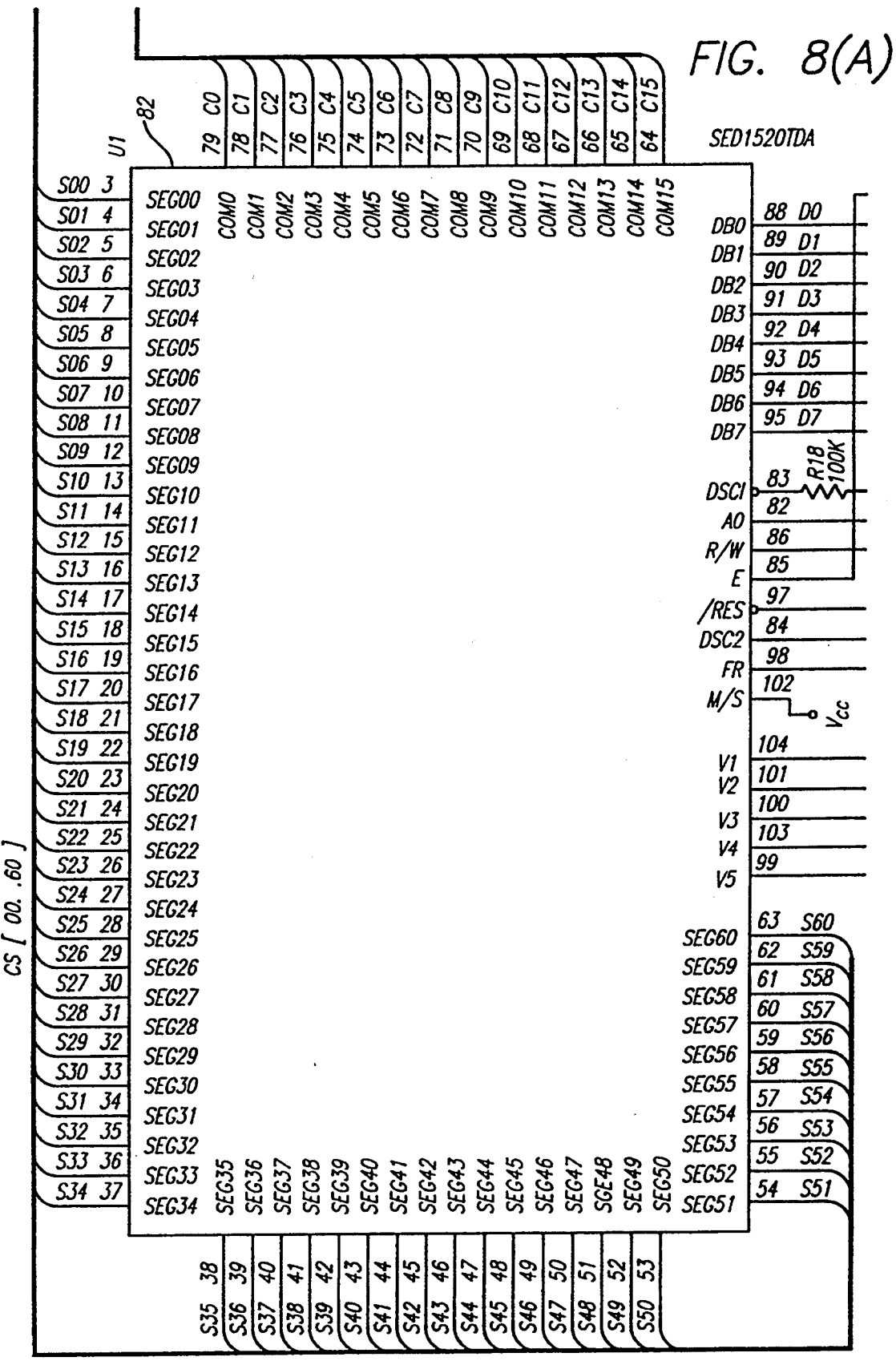
FIG. 8 (composed of the union of FIGS. 8A–8G) is a schematic logical circuit diagram depicting the relationship between the output signals from the microprocessor of FIG. 7 and the controllers of the pixels of the LCD display of FIGS. 1–2.
Figure 8C:
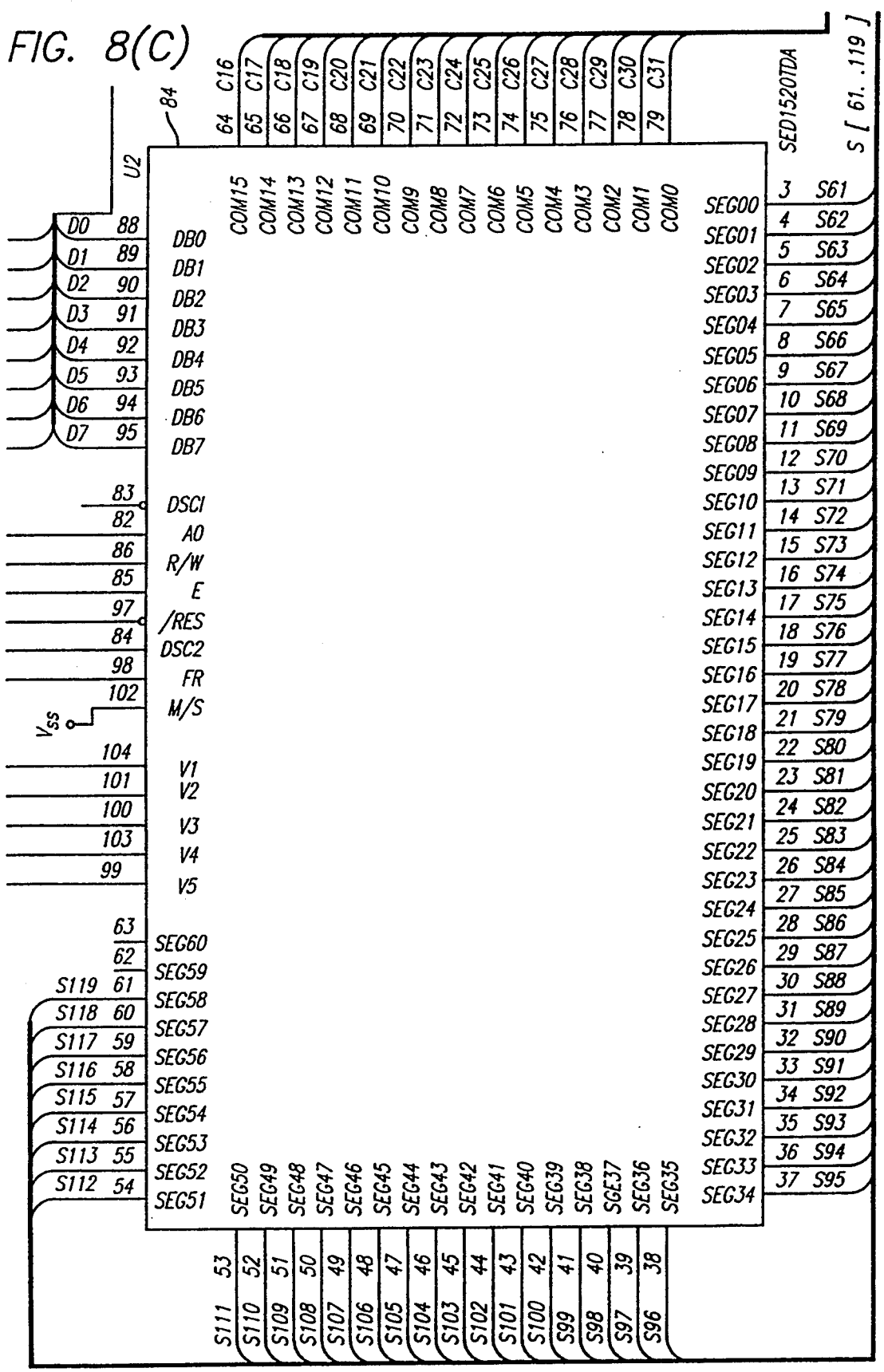
Figure 8D:
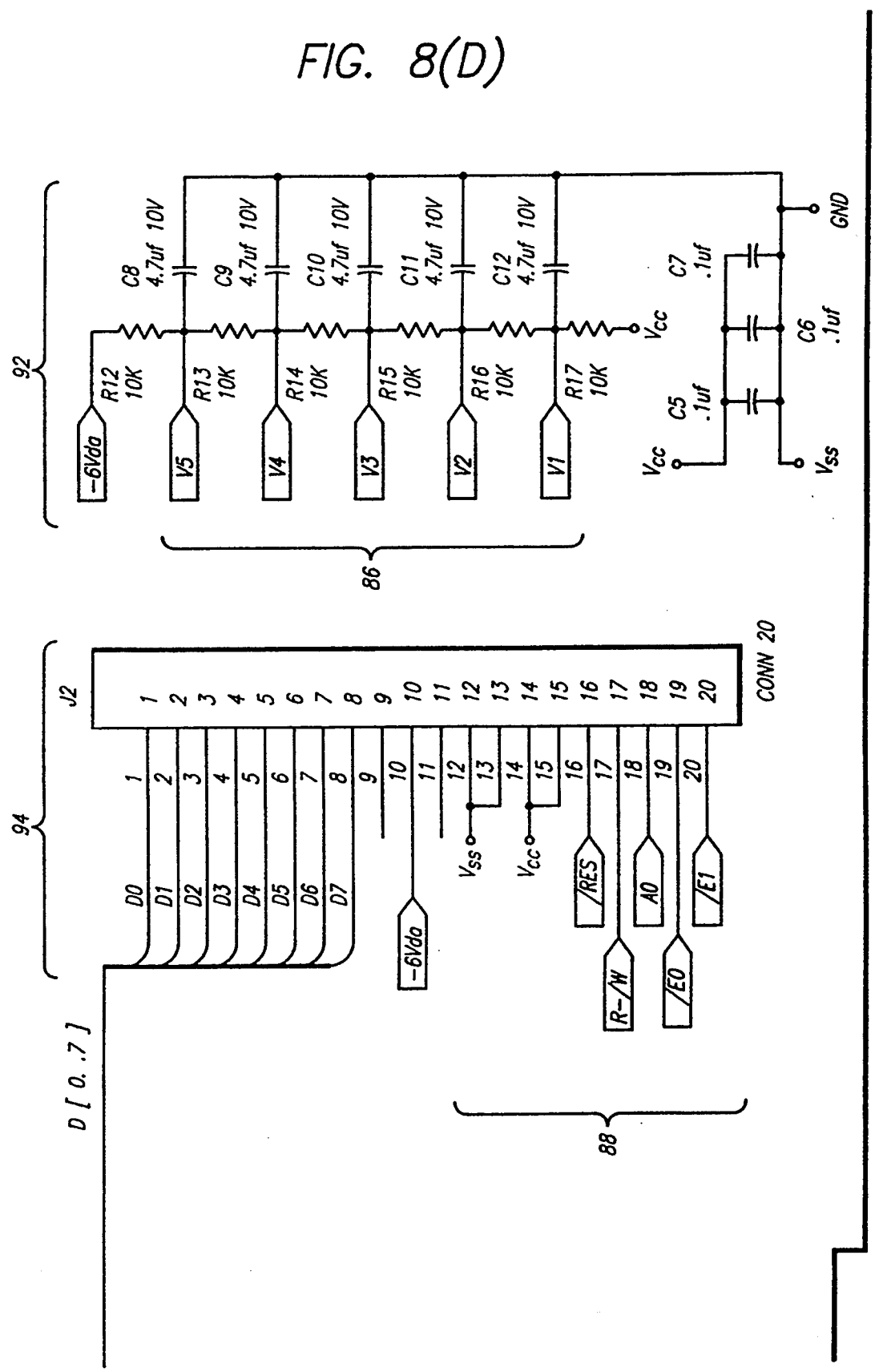
Figure 8G:
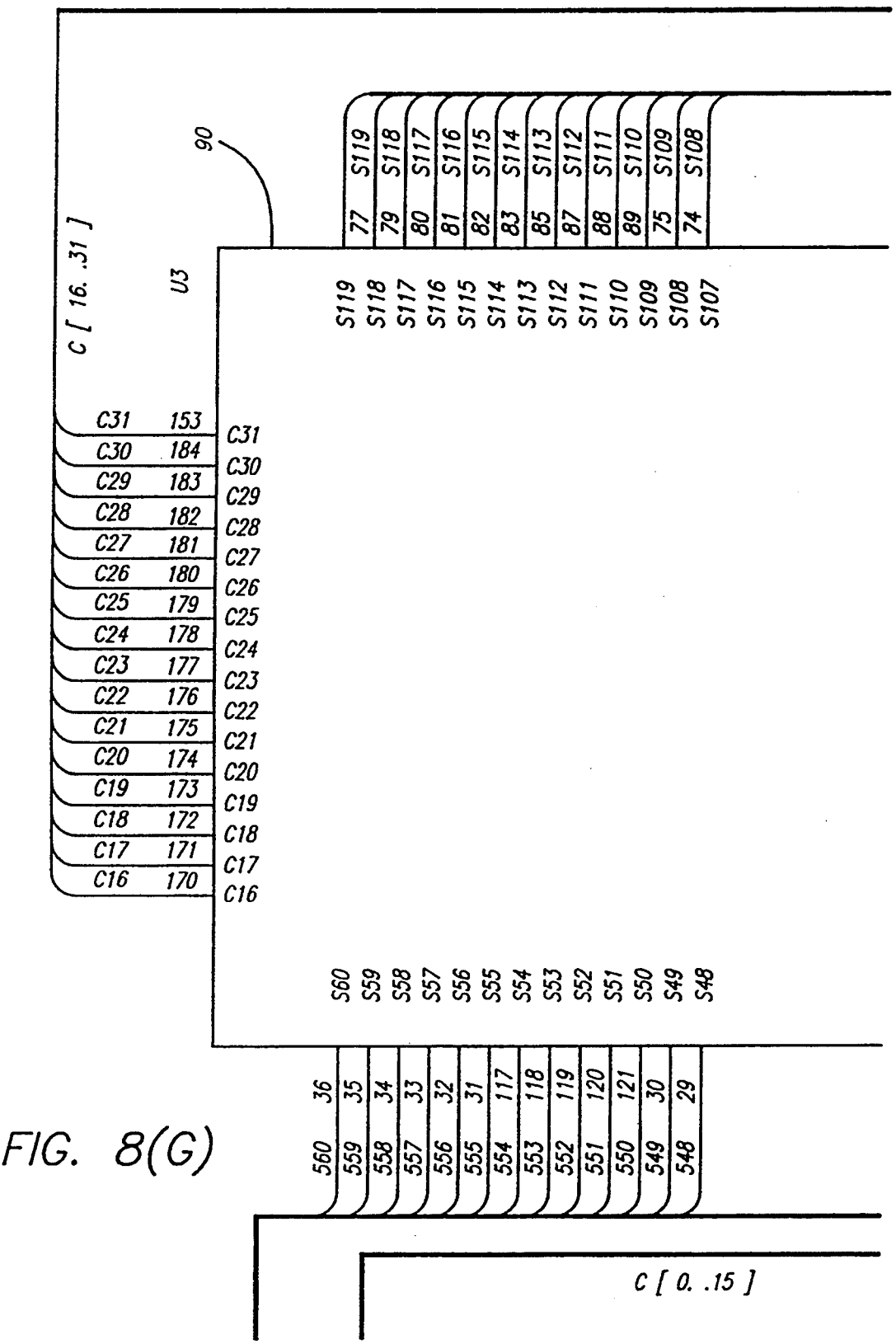

The embedded software program which implements the scrolling operations describe above is of a known algorithmic type which is presented in the program flowchart of FIG. 6.

Referring to FIG. 7 (composed of the juxtaposition of FIGS. 7A through 7F in the pattern shown in miniature in FIG. 7A) and FIG. 8 (similarly composed of FIGS. 8A–8F), the design of a Printed Circuit Board (PCB) implementation of the internal electronic system, presented in modular form in FIG. 5, is provided. In an obvious alternative embodiment, VLSI techniques developed for the production of Application Specific Integrated Circuits (ASICs) may be used.

In FIG. 7, the microprocessor unit 54 is connected to a frequency discerning crystal circuit 56 and a power-on reset circuit 58, as well as a keyboard demultiplexer 60, an address bus demultiplexer 62, a chip select demultiplexer 64, a RAM select inverter 66, a random access memory (RAM) unit 68, a piezoelectric buzzer/transducer and driver circuit 70, and an LCD charge pump 72. The system also incorporates a power supply filter circuit 74 and a power supply (not shown). Attached to the keyboard demultiplexer 60 is a switch matrix 76, a portion 78 of which functions as the left-hand scroller, and another portion 80 of which functions as the right-hand scroller. Attached to the chip select demultiplexer 64 is a connector 94 which connects the LCD controller chips to the PCB composed of elements 54–80.

In FIG. 8 the LCD controller chip 1, designated as element 82, and the LCD controller chip 2, designated as element 84, are connected to switch PCB connector 94 via mode select and data lines 86. Also the chips 82 and 84 are connected to LCD bias voltages 86 which are connected to the LCD bias voltage divider circuit 92. The outputs from the chips 82 and 84 drive the LCD display 90, which incorporates a 32 by 120 pixel information output display.

The design and fabrication of the electronic system presented in FIGS. 7–8 is conventional and well known to those of ordinary skill in the most closely related arts. Accordingly, specification of further details is not necessary and for brevity is omitted.

While a unique apparatus and method of electronically simulating the performance, operation and appearance of a mechanical rotary-type directory is thus disclosed, the electronic simulation of mechanical rotary-type cardfiles can be further enhanced by providing an internally-controlled electronically-generated sound which audibly mimics the expected mechanical sound of flipping through the cards of a standard mechanical cardfile.

In the preferred embodiment of FIG. 1, the electronic circuitry embedded under left-hand operable graphic 16 is used to scroll from simulated card to simulated card while the electronic circuitry under right-hand operable graphic 18 is used for vertical scrolling of a simulated card having more lines of information stored than can be displayed simultaneously on the preferred display screen.

Those skilled in the art will understand that the same electronic circuitry may also be used to perform other scrolling functions when other operational modes are selected. For example, in the preferred embodiment of FIG. 1, the circuitry under operable graphic 16 or 18 is used to advance or retreat through the months when the device is in the "calendar mode".

It would also be an obvious alternative embodiment, within the scope and spirit of the presently disclosed invention, to either interchange the above described operations performed by the circuitry embedded under right and left hand operable graphics 16 and/or 18 or else to omit the vertical scrolling feature entirely, or else to eliminate the left-hand scrolling mechanism in favor of single scrolling mechanism and to include the vertical scrolling function (if desired) as an auxiliary function or functions of such single scrolling mechanism by means of an auxiliary mode-changing switch (not shown).

Notably, alternative operable visual representations of mechanical rotary-type directories and corresponding embedded circuitry are possible. For example, the alternative presently preferred embodiment of FIG. 2 includes an operable perspective graphic representation of an entire mechanical rotary-type directory with the operable portion corresponding to a portion of the arcuate edge of the rotary actuator 19 depicted thereon. Advantageously, methods known in the graphic arts may be used to electronically regenerate a photographic image of a real mechanical rotary-type directory on the underside of the overlay.

Figure 2A:
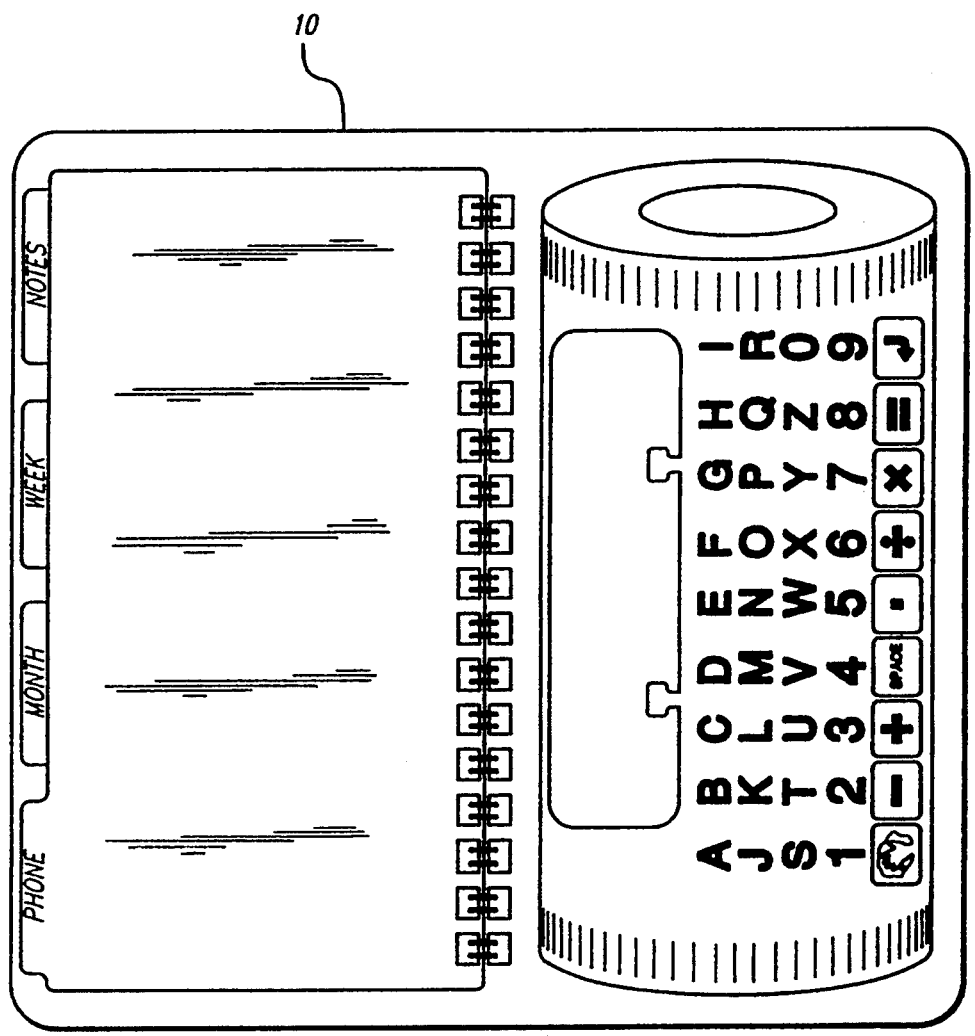
FIG. 2A depicts the face of an alternative presently preferred embodiment of the invention wherein the simulated rotary actuator includes operable depictions of perspective views of left and right hand rotary actuators and wherein a visual display which presents simulated rotary index cards is provided between the operable depictions to further simulate a mechanical rotary cardfile.

The alternative preferred embodiment of FIG. 2A includes operable perspective depictions of left and right hand mechanical rotary actuators. In this embodiment, the simulated index card display is provided between the left and right hand actuators so as to further simulate the appearance of a mechanical rotary-type cardfile.

The presently preferred embodiments of the present invention may be conveniently sized for insertion into a wallet, e.g., having a size and thickness resembling a credit card or similar wallet-insertable card, using recent advances in micro-miniaturization of electronic devices, or may be provided in a less miniaturized format resembling a conventional hand-held or pocket-size calculator or similar device.

Figure 9:
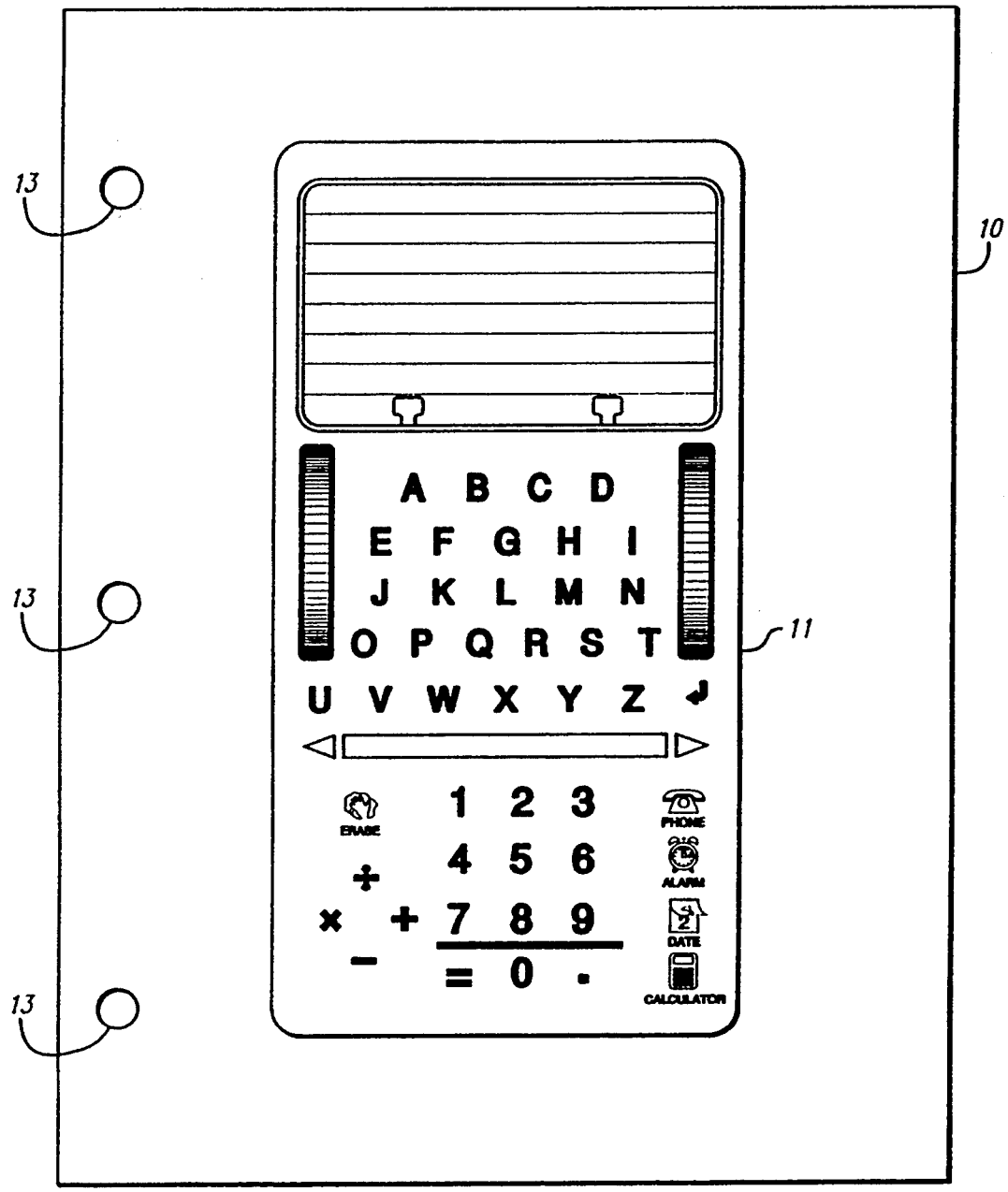
FIG. 9 depicts the face of still another alternative presently preferred embodiment of the invention, in which the peripheral margins of the enclosure (which contains the information-input keys and icons and the information-output display screen) are composed of transparent plastic and correspond to the dimensions and shape of a ring-binder divider-sheet, and an array of holes is provided on the inner margin to facilitate insertion of the enclosure within a ring-type binder.

As best shown in FIG. 9, the preferred device may be alternatively sized for insertion into a ring-type binder notebook or personal organizer. In this preferred embodiment, the displayed face 11 of the information input and output subsystems depicted in FIGS. 1–2 is located between the margins of enclosure 10 which extend outwardly so as to simulate a conventional loose-leaf insert for the selected notebook or organizer. The enclosure, which is preferably an injection molded plastic, includes an array of integrally formed holes 13 at the left margin for placement of the enclosure into a ring-type binder notebook or personal organizer as best shown in FIG. 9. The holes 13 may be configured as elongate slots to facilitate insertion in binders of different configurations. The enclosure may also be provided with a indexing tab (not shown) along the right hand margin to assist the user in locating the device. The enclosure preferably has a maximum thickness not exceeding about 0.20 inches.

Alternative preferred apparatus and methods for sensing the direction and rate of sliding movement of a finger or other user-controlled contactor device which fall within the scope and spirit of the present invention will now be presented.

Discrete Switches

One alternative method for sensing the direction and rate of sliding movement of a finger or other user-controlled contactor device along an operable graphic involves the use of a two-ply flexible switch panel wherein multiple switches 46 are provided in a linear pattern between the plies with a graphic representation of the mechanical actuator to be emulated is provided on the exposed surface of the outer ply. As a thumb or finger or other user-controlled contactor device, such as a pencil, is drawn along the operable graphic, the switches are actuated in sequence. An electronic interface unit is used to convert the switch closures to position and rate information corresponding to the speed and direction of motion.

Inductance Oscillator

In another presently preferred alternative method, the graphic-bearing overlay is provided with two elongate conductors which are engaged by a finger or other user-controlled contactor device as the contactor device is moved along the surface of the representational graphic. The two conductors are connected to an electronic circuit to form an oscillator. The conductors and the finger or user-controlled contactor device together form the feedback portion of the oscillator. The oscillation frequency is altered by the location of the operator's finger or contactor device along the conductors. The cycle period of the oscillator output is then determined using electronic circuitry. This period has a direct relation to the oscillator frequency and therefore the position of the operator's finger or contactor device. The direction and rate of change of movement along the operable graphic are thus determinable from the change in the cycle period.

Alternatively, the direction and rate of change of movement along the operable graphic may be determined from the deviation of the oscillator frequency from a given standard using electronic circuitry known to those skilled in the relevant arts, i.e., through the use of a tuned circuit and filter network, a signal may be extracted that has a voltage related to the oscillator frequency. By the use of an analog to digital converter (ADC), a binary value may be produced that has a direct relation to the position of the operator's finger or contactor. The direction and rate of movement of the operator's finger or contactor may thus be determined by the polarity and rate of change of the binary signal.

Resistive Sensor

In another presently preferred embodiment, the direction and rate of sliding movement of a finger or other user-controlled contactor device along an operable graphic is accomplished using two thin flexible polymer substrates and an thin integral spacer. A resistive coating is deposited in a predetermined shape on the top surface of the lower substrate and the bottom surface of the other. These coated surfaces are laminated together with the integral spacer cut out to match the resistive coating. When pressure is applied to the upper surface of the upper substrate, the upper substrate sags allowing contact between the coated surfaces. A resistance proportional to the location of the point of pressure on the overlay is then ascertainable.

There are three presently preferred alternative methods to determine position information from this resistance. In a first presently preferred method, the resistance is transformed into a voltage signal proportional to the resistance. Using an analog to digital converter (ADC), a binary value may be produced that has a direct relation to the position of the operator's finger or contactor device. The direction and rate of movement of the operator's finger or contactor device are then determined from the polarity and rate of change of the binary signal.

Alternatively, the two coated substrates may be connected to an electronic circuit to form an oscillator wherein the coated substrates form the feedback portion of the oscillator. The oscillation frequency is altered by the location of point pressure along the upper surface of the upper substrate. Using electronic circuitry known to those skilled in the arts, the cycle period of the oscillator output may be determined. This period has a direct relation to the oscillator frequency and therefore to the position of the operator's finger or contactor device.

Alternatively, direction and rate of movement along the upper surface of the upper substrate may be determined through the use of a tuned circuit and filter network. A signal may be extracted having a voltage related to the oscillator frequency. Using an analog to digital converter (ADC), a binary value is produced that has a direct relation to the position of the operator's finger or contactor device. The direction and rate of movement of the operator's finger or contactor are determined from the polarity and rate of change of the binary signal.

Optical Sensor

There are two presently preferred alternative methods for determining direction and rate of movement information through the use of optical sensors.

A first alternative method is passive. Photo transistors are installed beneath a graphic-bearing overlay constructed to have a series of small "windows" to allow ambient light to reach the photo transistors. As the finger or other user-controlled contactor device is drawn across the graphic-bearing overlay, the light is interrupted in sequence. An electronic interface unit is used to convert the photo transistor signals into position information corresponding to the speed and direction of motion.

A second alternative method is active. Photo transistors and light emitting diodes (LED) are installed beneath a graphic-bearing overlay constructed to have a series of small "windows" Light from the LEDs is emitted through these "windows". When an object such as a finger or other contactor device is drawn across a "window", the light emitted by the LED is reflected back and sensed by a photo transistor. An electronic interface unit is used to convert the photo transistor signals into position information corresponding to the speed and direction of motion.

Electronic circuitry controlled by embedded software is thus used to sense the direction and rate of motion of the operator's thumb or other user-controlled contactor device and convey this sensed motion into the operation of the electronic device in a manner which emulates both performance and operation of its mechanical analog.

Although the present invention has thus been described in detail with regard to the preferred embodiments and drawings thereof, it should be apparent to those skilled in the art that various adaptations and modifications of the present invention may be accomplished without departing from the spirit and the scope of the invention. Thus, by way of example and not of limitation, alternative electronic subsystems in addition to those discussed hereinabove may be utilized to provide substantially the same results in substantially the same manner.

Furthermore, it is possible to use alternative power technologies instead of conventional rechargeable batteries; for example, photovoltaic units may be incorporated to keep the batteries charged. In addition, the parts need not have the precise configuration described hereinabove, but may have alternative arrangements. Further, instead of the structural parts being made of metal or plastics, they may in many cases be formed of composite materials.

Accordingly, it is to be understood that the detailed description and the accompanying drawings as set forth hereinabove are not intended to limit the breadth of the present invention, which should be inferred only from the following claims and their appropriately construed legal equivalents, rather than from the examples given.

What is claimed is:

1. In the field of compact, portable, lightweight, electronic information-processing devices suitable for storage and retrieval of information such as names, addresses, telephone numbers and personal memoranda, a simulated rotary-type directory operated by sliding contact along a visually simulated mechanical rotary actuator, comprising:

a thin enclosure containing upon an external face thereof
  a substantially rectangular LCD screen for presenting simulated directory index cards in the style of bottom-attachable rotary-type cards; and
  an alphanumeric keyboard for entering characters to be displayed upon said simulated cards;
a simulated rotary actuator for controlling sequential advancement of said simulated cards in a first direction corresponding with simulated clockwise sequential advancement of said simulated cards and for controlling sequential advancement of said simulated cards in a second direction corresponding with simulated counterclockwise sequential advancement of said simulated cards, said simulated rotary actuator being responsive to the direction and rate of movement of a user's thumb or another user-controlled contactor device such that a sliding movement of said user-controlled contactor device in a first direction along said simulated rotary actuator effects said simulated clockwise sequential advancement of said simulated cards at a rate which corresponds with said rate of movement of said user-controlled contactor device in said first direction and such that a sliding movement of said user-controlled contactor device along said simulated rotary actuator in a second direction opposite to said first direction effects said simulated counterclockwise sequential advancement of said simulated cards at a rate which corresponds with said rate of movement of said user-controlled contactor device in said second direction; and
an internal microprocessor system for accepting control signal inputs from said simulated rotary actuator and said keyboard, for presenting simulated directory index cards in the style of bottom-attachable rotary-type cards on said LCD screen, and for storing and retrieving information in and from an internal memory unit; and
a power-storage system connected to, and for powering, said LCD screen, said simulated rotary actuator, said keyboard and said microprocessor.

2. The device of claim 1 wherein said power-storage system comprises a rechargeable battery system.

3. The device of claim 1 wherein said keyboard contains a simulated typewriter style spacebar as the input key for the spacing input.

4. The device of claim 1 wherein said keyboard contains an operative icon for erasure of entered and displayed characters which depicts a recognizably humanoid hand brushing with an erasing pad.

5. The device of claim 1 wherein said keyboard contains an operative icon, for entering or retrieving telephone numbers into said directory, which depicts a recognizable telephone.

6. The device of claim 1 wherein said keyboard contains an operative icon, for setting or reading calendar dates in an internal electronic calendar, which depicts a recognizable daily calendar pad.

7. The device of claim 1 wherein said keyboard contains operative icons, representing standard symbols for addition, subtraction, multiplication and division, which control the corresponding operations of an internal electronic calculator.

8. The device of claim 1 containing an internal electronic calculator which is switched on or off by pressing an icon which depicts a recognizable early-style hand-held electronic calculator.

9. The device of claim 1 containing an internal electronic sound-generator which produces a sound simulating the sound of sequential flipping of the cards of a mechanical rotary-type directory.

10. The device of claim 1 containing upon said face a second simulated rotary actuator for vertical scrolling of any displayed simulated card.

11. The device of claim 1 containing upon said face a second simulated rotary actuator for panning or horizontal scrolling of any displayed simulated card.

12. The device of claim 1 wherein said simulated rotary actuator comprises an operable graphic representation of a side view of a mechanical rotary actuator.

13. The device of claim 1 further comprising an operable graphic representation of a perspective view of a mechanical rotary actuator.

14. The device of claim 1 wherein said enclosure further comprises holes rendering said enclosure insertable within a ring-type binder.

15. In the field of compact, portable, self-powered, thin electronic devices suitable for storage and retrieval of information such as names, addresses, telephone numbers and personal memoranda, an electronic directory provided in a thin enclosure comprising:
  an information-processing subsystem;
  a user-accessible information input subsystem;
  a visual display information output subsystem; and
  a contact and sliding movement sensitive scrolling mechanism operable by sliding engagement of a thumb or other user-controlled contactor device with said scrolling mechanism.

16. The system of claim 15 wherein said scrolling mechanism further comprises an operable visual representation of a mechanical scrolling mechanism.

17. The system of claim 16 wherein a mechanical rotary scrolling mechanism is visually represented.

18. The device of claim 17 wherein said enclosure further comprises holes rendering said enclosure insertable within a ring-type binder.

19. The device of claim 18 containing an internal electronic sound-generator which produces a sound simulating the sound of sequential flipping of the cards of a mechanical rotary-type directory.

20. The device of claim 15 wherein said contact and sliding movement sensitive scrolling mechanism is responsive to the direction and rate of movement of said user-controlled contactor device.

21. An electronic information-processing system comprising:
   an information-processing subsystem;
   a user-accessible information input subsystem;
   a visual display information output subsystem; and
   a contact and sliding movement sensitive scrolling mechanism operable by sliding engagement of a thumb or other user-controlled contactor device with said scrolling mechanism.

22. The system of claim 21 wherein said scrolling mechanism further comprises an operable visual representation of a mechanical scrolling mechanism.

23. The system of claim 21 wherein said scrolling mechanism further comprises an operable visual representation of a mechanical rotary scrolling mechanism.

24. The device of claim 20 wherein said contact and sliding movement sensitive scrolling mechanism is responsive to the direction and rate of movement of said user-controlled contactor device.

25. A compact, portable, lightweight, electronic device suitable for the storage and retrieval of information such as names, addresses, telephone numbers and personal memoranda, said electronic device comprising:
   a thin enclosure containing upon an external surface thereof
      a display screen; and
      an keyboard for entering characters to be displayed upon said display screen;
   at least one aperture within said enclosure rendering said enclosure insertable within a ring-type binder;
   an internal microprocessor system for accepting control signal inputs from said keyboard, for operating display screen, and for storing and retrieving information in and from an internal memory unit; and
   a power-storage system connected to, and for powering, said display screen, keyboard and microprocessor.

* * * * *